United States Patent
Merdinger

(10) Patent No.: US 11,964,753 B2
(45) Date of Patent: Apr. 23, 2024

(54) PERSONAL QUADCOPTER AIRCRAFT

(71) Applicant: Doroni Aerospace Inc., Coral Gables, FL (US)

(72) Inventor: Doron Merdinger, Boca Raton, FL (US)

(73) Assignee: Doroni Aerospace Inc., Coral Springs, FL (US)

( * ) Notice: Subject to any disclaimer, the term of this patent is extended or adjusted under 35 U.S.C. 154(b) by 231 days.

(21) Appl. No.: 17/478,870

(22) Filed: Sep. 17, 2021

(65) Prior Publication Data

US 2022/0081107 A1 Mar. 17, 2022

Related U.S. Application Data

(60) Provisional application No. 63/079,503, filed on Sep. 17, 2020.

(51) Int. Cl.
*B64C 27/22* (2006.01)
*B64C 29/00* (2006.01)
*B64D 27/24* (2006.01)

(52) U.S. Cl.
CPC .......... *B64C 27/22* (2013.01); *B64C 29/0025* (2013.01); *B64D 27/24* (2013.01)

(58) Field of Classification Search
CPC ..... B64C 27/22; B64C 29/0025; B64C 27/10; B64C 27/20; B64C 39/08; B64D 27/24; Y02T 50/40; Y02T 50/60
See application file for complete search history.

(56) References Cited

U.S. PATENT DOCUMENTS

| 3,618,875 | A | * | 11/1971 | Kappus | B64C 29/0025 244/12.3 |
|---|---|---|---|---|---|
| 7,249,732 | B2 | * | 7/2007 | Sanders, Jr. | B64C 27/12 244/12.1 |
| 10,301,016 | B1 | * | 5/2019 | Bondarev | B64C 29/0033 |
| 10,737,797 | B2 | * | 8/2020 | Murrow | B64D 27/24 |
| 10,994,838 | B2 | * | 5/2021 | DeLorean | B64C 39/04 |
| 11,077,937 | B1 | * | 8/2021 | Bruell | B64C 1/14 |
| 11,142,309 | B2 | * | 10/2021 | Deslypper | B64C 17/06 |
| 2007/0018035 | A1 | * | 1/2007 | Saiz | B64C 39/10 244/12.3 |
| 2012/0043413 | A1 | * | 2/2012 | Smith | B64C 29/0033 244/12.4 |
| 2013/0062455 | A1 | * | 3/2013 | Lugg | B64C 39/12 244/12.3 |
| 2013/0251525 | A1 | * | 9/2013 | Saiz | B64C 27/26 416/23 |
| 2015/0266571 | A1 | * | 9/2015 | Bevirt | B64C 11/28 244/7 C |
| 2016/0244156 | A1 | * | 8/2016 | Leng | B64C 29/0025 |

(Continued)

*Primary Examiner* — Valentina Xavier
(74) *Attorney, Agent, or Firm* — James P. Demers; Cittone Demers & Arneri LLP

(57) ABSTRACT

An aircraft having two or more pairs of airfoils, each airfoil having an embedded vertical thruster. The vertical thrusters provide sufficient lift to permit the aircraft to perform vertical takeoffs and landings. The aircraft has two or more horizontal thrusters which accelerate the aircraft to a speed at which the airfoils provide most or all of the lift required to maintain altitude. In horizontal flight, the vertical thrusters may operate at a reduced power level, sufficient to control the orientation of the aircraft.

8 Claims, 4 Drawing Sheets

(56) References Cited

U.S. PATENT DOCUMENTS

| | | | |
|---|---|---|---|
| 2016/0244158 A1* | 8/2016 | Fredericks | B64C 3/40 |
| 2016/0304193 A1* | 10/2016 | Marcel | B64C 27/20 |
| 2017/0029131 A1* | 2/2017 | Steinwandel | B64D 27/24 |
| 2018/0141652 A1* | 5/2018 | Deslypper | B64C 39/12 |
| 2019/0112039 A1* | 4/2019 | Pfaller | B64C 27/20 |
| 2019/0263515 A1* | 8/2019 | Karem | B64C 39/024 |
| 2021/0107667 A1* | 4/2021 | Sinha | B64D 27/24 |

* cited by examiner

PERSONAL QUADCOPTER AIRCRAFT

RELATED APPLICATIONS

This application claims priority of U.S. Provisional Patent Application Ser. No. 63/079,503 filed on Sep. 17, 2020, the entire contents of which are incorporated herein by reference for all purposes.

FIELD OF THE INVENTION

The present invention relates to the field of multirotor vertical takeoff and landing (VTOL) aircraft, in particular to VTOL aircraft obtaining lift from ducted rotors.

BACKGROUND

Unmanned multicopter aircraft, in particular quadcopters, have become a common form of unmanned aerial vehicle (UAV), commercially available as battery-powered drones having sufficient lifting power to raise small loads, such as cameras for aerial photography. Larger versions are capable of delivering modest-sized packages, and rideable multicopters, capable of lifting a human, have been constructed.

A common limitation of helicopters, and of multicopters, is the consumption of a considerable amount of energy to maintain altitude, as all lift is provided by the motion of the rotors through the air. This limits the mass that can be lifted; in particular it limits the ability of the craft to carry human passengers without having powerful engines and a substantial supply of fuel.

There is a need for quiet, electrically-powered personal aircraft, but the energy demands of rotor-lifted craft are not met in a practical way by today's battery technology. The lifting capacity and/or duration of flight of the experimental and prototype vehicles constructed to date are limited, and only motorcycle-like single-rider "hover bikes" have been commercialized (e.g. the Hoversurf™ S3, from Hoversurf Inc., Burlingame CA.)

Tilt-rotor VTOL aircraft, e.g. Boeing's V22 Osprey, have been developed with thrusters that rotate 90°, transitioning from a lifting role to a horizontal acceleration role. With the thrusters operating in the latter mode, the craft operates as a winged aircraft, and flies with the much greater fuel efficiency of an airplane. However, the rotating thrusters are mechanically complex and require a great deal of maintenance, and operation of the craft during transitions between vertical and horizontal flight regimes presents challenging control problems.

Winged VTOL aircraft having a separate propulsion system to power horizontal flight have been designed, e.g. U.S. Pat. No. 8,220,737 and the XV-58 "Manta" designed at Georgia Institute of Technology. Electric VTOL (eVTOL) aircraft having a separate propulsion system to power horizontal flight, with lift provided by fans during VTOL operation and by airfoils during horizontal flight, are presently under development; see, e.g., U.S. patent Application Publication No. 2019/0308723.

In order to provide practical carrying capacity and flight time, there remains a need for an electrically-powered personal aircraft that has VTOL capabilities, but also has the capacity for horizontal flight using lift provided by airfoils rather than by rotors.

SUMMARY OF THE INVENTION

The present invention provides an aircraft that is lifted by four electrically-powered ducted rotors. Each of the ducted rotors comprises a pair of counter-rotating rotors, and is embedded within one of four airfoils. The embodiment presented here is capable of transporting one or two individuals in an enclosed cockpit, but the invention encompasses both smaller, "rideable" aircraft, and larger, multi-passenger embodiments.

Horizontal thrust is provided by two or more electric propellers mounted on the fuselage. After vertical takeoff, the horizontal thrusters accelerate the craft forward, and as the velocity increases the airfoils generate an increasing amount of lift. The lift required of the vertical thrusters (and the demand on the batteries) is correspondingly reduced, and in the limiting case, the craft smoothly transitions to an airplane mode of flight. In a preferred embodiment, the vertical thrusters are no longer required to maintain altitude, but they may continue to operate at a reduced output, where they provide supplemental lift and may also provide backup attitude control.

A feature of the present invention is the inherent resistance of the four-wing design to stalling. As the nose of the aircraft pitches up in flight, the lift provided by the fans in the forward pair of airfoils naturally decreases, and the aircraft returns to level flight. This takes place whether or not the craft is in the level flight regime. Another feature is that directional control (yaw), pitch and roll control are provided by manipulating the speed of the four fans, the rapid response of which to control inputs is made possible by their electric propulsion. Routine control during level flight is greatly simplified by the absence of multiple control surfaces such as a vertical rudder, ailerons, and stabilizers. A set of flaperons on the forward airfoils are provided for lift, and to serve as alternative/backup control devices. Additional flaperons on the rear wings may be provided in alternative embodiments.

DETAILED DESCRIPTION OF THE INVENTION

Specific arrangements of the components of the invention are described below to illustrate the invention. These examples, and the accompanying drawings, are not intended to be limiting.

Figure 1:
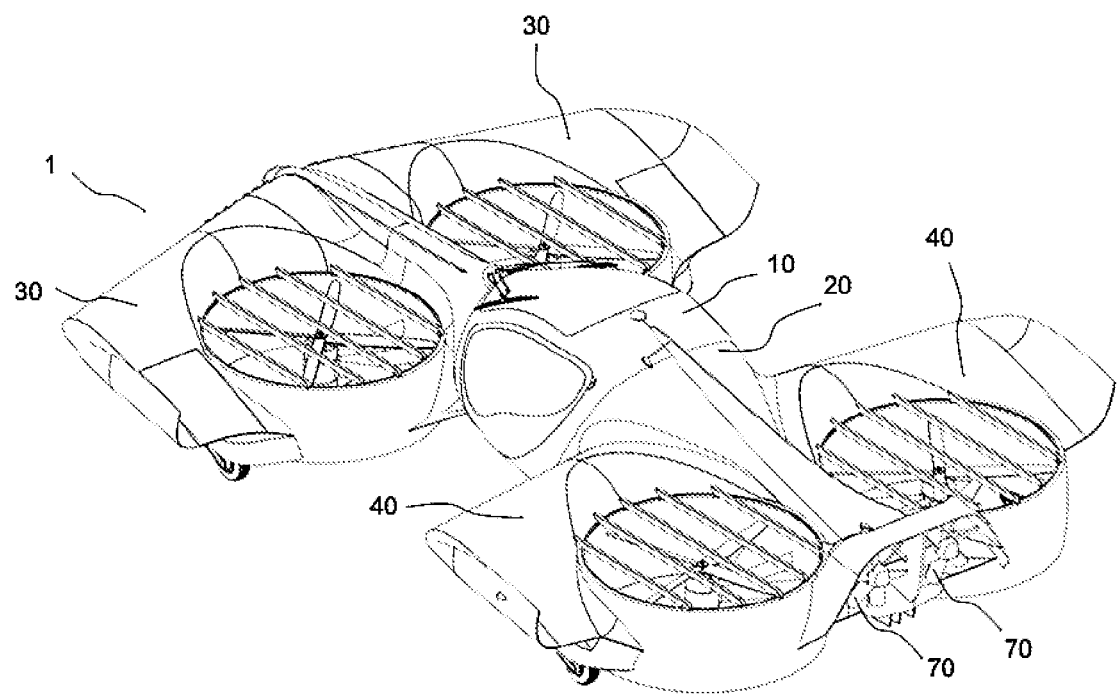
FIG. 1 is a perspective drawing of one embodiment of the invention.
Figure 2:
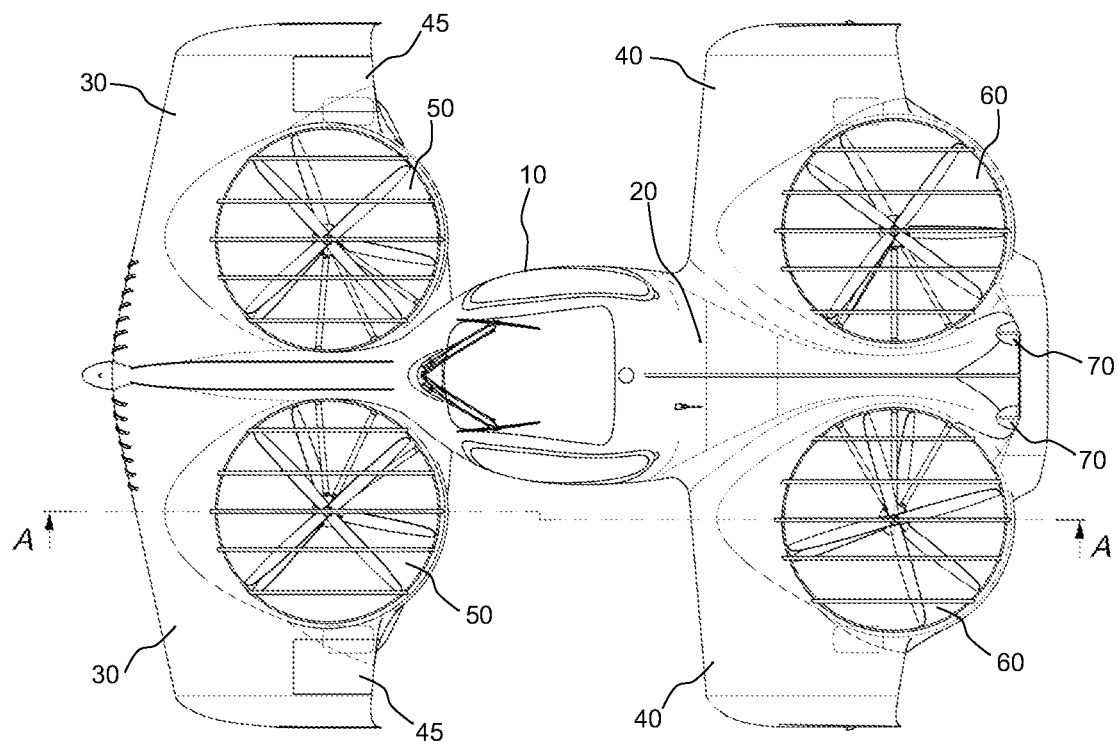
FIG. 2 is a top view of the same embodiment.

FIGS. 1 and 2 show, respectively, a perspective and top view of a representative aircraft 1 according to the invention. In FIG. 1 an enclosed cockpit 10 is integral to a fuselage 20, which has in this embodiment a pair of forward airfoils 30 and a pair of rear airfoils 40. The forward airfoils are equipped with flaperons 45. The flaperons are used to increase the lift of the forward airfoil at low speeds, and at full flight speed to control roll and pitch of the craft. At sub-airplane speeds, roll and pitch are controlled by modulation of the vertical thrusters as described below.

The above airframe components may be constructed of any materials known to be suitable for aircraft, such as aluminum alloys and composite materials. Lightweight carbon composites are preferred.

Embedded in the airfoils are vertical thrusters 50 and 60. Alternative embodiments may have more than one thruster per airfoil, in order to provide the desired levels of fuel efficiency, carrying capacity, and redundancy. The vertical thrusters are preferably electrically-driven, counter-rotating fan blades or propellers, operating within a shroud. Electric, ducted-rotor thrusters are well-known in the art, and the invention does not rely on any particular design for operability. Suitable electric ducted fans (EDFs) and electric turbofans (ETFs) include but are not limited to the Athena™ line of ETFs from Neva Aerospace Ltd., Brighton, U.K.

For ease and economy of maintenance, all of the vertical thrusters are preferably of the same mechanical design. The use of counter-rotating blades, to eliminate aircraft control problems created by gyroscopic forces, is greatly preferred. The use of multiple off-axis fans, at a distance from the center of mass of the aircraft, eliminates the need for a collective to modulate blade pitch, which reduces weight and complexity. Power is provided by any suitable batteries; in alternative embodiments the battery capacity may be augmented by onboard fuel cells or a conventionally-powered generator.

The individual thrusters are preferably operated electronically, through coordinated instructions provided by an automatic flight control system as described further below. The computer-coordinated operation of multiple vertical thrusters by flight control software, originally developed by Niwa and Sugiura in 1987, is now well-known in the art, and can be carried out by commercially available software and hardware packages. Flight control through the computerized management of thrusters in quadcopters, in particular, is a well-developed technology.

Affixed to the fuselage are horizontal thrusters 70 oriented so as to provide forward thrust during level flight. Thrusters 70 are mounted in or close to the horizontal plane of the aircraft's center of gravity (or the expected center of gravity when loaded with passenger(s) and cargo), so as to limit any induced pitching moment when the thrusters are in use. Thrusters 70 provide sufficient forward airspeed to permit operation as a "fixed wing" aircraft, reducing or eliminating reliance on the vertical thrusters. Since fixed wing aircraft are more fuel efficient than helicopters or multirotor aircraft, transitioning from vertical to less powerful horizontal thrusters reduces energy consumption and increases flying time for a given amount of fuel or battery charge.

The thrusters 70 may be operated differentially, providing a yaw moment that can be used to control the aircraft's orientation and direction. This reduces or eliminates the need for a rudder, and as with the vertical thrusters, is enabled by direct electronic control of the rotor speeds. As with the vertical thrusters 50 and 60, the horizontal thrusters 70 rely on well-established and commercially-available pusher-prop technology. Preferred embodiments include ducted-fan and shrouded-propeller thrusters.

Figure 3:
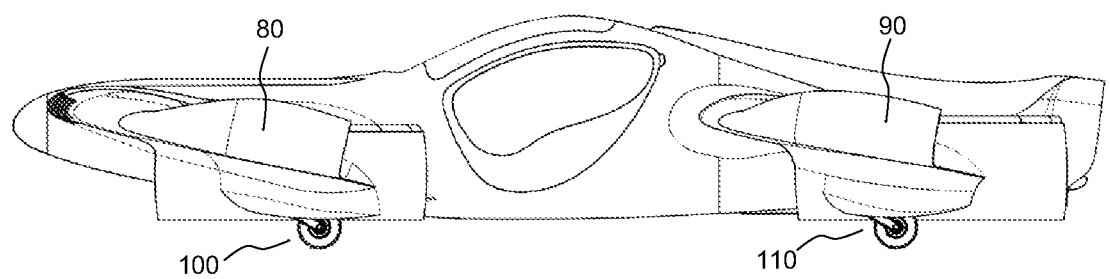
FIG. 3 is a side view of the same embodiment.

FIG. 3 is a side view of the same embodiment. The tips of the forward and rear wings are equipped with winglets 80 and 90, respectively. As is known in the art, winglets serve to reduce drag by reducing vortex formation at the wingtips. Forward and rear landing gear 100 and 110 are preferably shock-mounted wheels, as shown, for ease of moving on the ground or into a hangar or garage. Skids, skis, floats, and the like may be used in alternative embodiments, as is known in the art.

Figure 4:
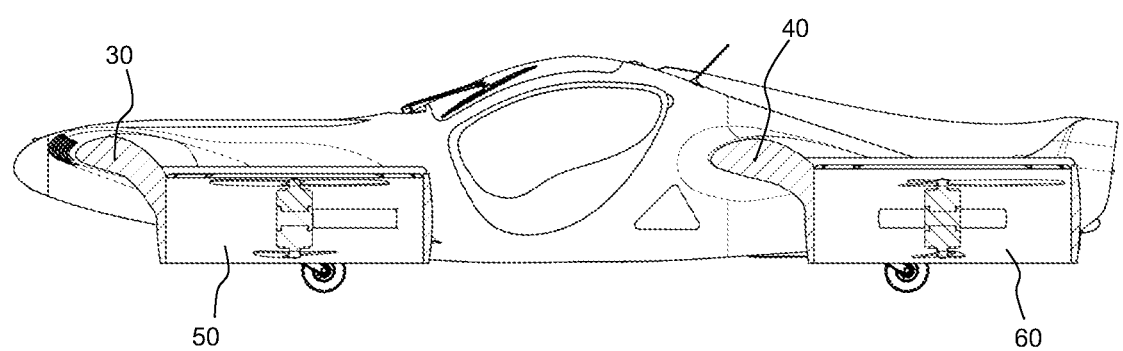
FIG. 4 is a cut-away drawing through the airfoils and vertical thrusters.

FIG. 4 shows a vertical cut-away view through the forward and rear airfoils, and through the rotors embedded therein. It will be appreciated from this drawing that during horizontal flight, laminar flow across the tops of the airfoils feeds compressed air directly into the vertical thrusters, while laminar flow across the lower surfaces of the airfoils is directed across the exits of the vertical thrusters.

A feature of the invention, illustrated in FIG. 3, is that the attack angle of the forward airfoil 30 (13° in this embodiment) is slightly greater than the attack angle of the rear airfoil 40 (10° in this embodiment.) This provides slightly greater lift at the forward airfoil 30 at all airspeeds, and the center of gravity of the craft as a whole is preferably located sufficiently forward to compensate, so as to provide neutral lift in horizontal flight. This is most conveniently achieved via appropriate placement of the batteries. To the extent that the craft, together with the passenger(s) and cargo, present a center of gravity that is not at the center of lift of the two airfoils, the flaperons (and optionally the forward and rear vertical thrusters) are operated so as to compensate.

The greater angle of attack of the forward airfoil 30 has the effect of causing the forward airfoil to stall at a higher speed than does the rear airfoil. Thus, as the craft approaches stall conditions through loss of airspeed and/or an increase in upward pitch, the forward airfoil 30 will be the first to stall. The angle of attack of the forward airfoil 30 is between 1° and 8° greater than that of the rear airfoil 40, preferably between 2° and 5° greater, and more preferably 3-4° greater.

As shown in FIGS. 3 and 4, where the vertical thrusters are embedded in the airfoils, the upper surfaces of the airfoils aft of the point of maximum camber are angled downward significantly, so as to direct laminar flow over the wing into the intakes of the thrusters. This supply of compressed air improves the efficiency of the thrusters and increases the provided lift as the craft accelerates forward. The thruster shrouds project below the lower surface of the airfoils, directing laminar flow away from the thrusters, thereby minimizing interaction of the thrusters with the airflow across the lower surfaces.

If the craft is allowed to nose up dangerously while partially supported by the thrusters (e.g. when transitioning from VTOL to level flight operation), as the forward airfoil 30 approaches stall conditions, the laminar airflow across the top of the forward airfoil begins to separate and flow turbulently. This disrupts the airflow into the forward thruster 50, reducing the lift being provided, and causing the nose of the craft to nose back down until lift is restored. The rear airfoil 40, having a lower attack angle, maintains laminar flow and the rear thrusters 60 do not lose lift. This anti-stall mechanism operates at any forward speed that generates laminar flow, and is in addition to the known function of canards in conventional aircraft, which prevent stalls at flight speed via loss of lift from the canards themselves.

For vertical landing, the vertical thrusters are engaged to provide lift as the airspeed decreases, and are fully engaged when the airfoils cease to provide lift. The horizontal thrusters 70 are then used as needed to position the craft for vertical landing.

The flight control system comprises one or more processors, in operating communication with volatile and non-volatile computer storage. The non-volatile (non-transient) storage may be a computer-readable medium such as a hard drive or, preferably, solid-state memory such as an SSD, and stores machine-readable instructions, including the flight control software, for execution by the processor(s). The processor(s) are coupled to various input/output (I/O) devices for receiving input from various sensors, input from the pilot, and for providing output to cockpit displays, the thruster controllers, and control surfaces. Human interface devices may include digital readouts and analog dials, touch screens, heads-up displays, sticks and pedals, as are typical of modern VTOL aircraft.

The sensors include but are not limited to gyroscopes, accelerometers, tilt sensors, altimeters, GPS devices, Lidar, optic-flow camera, infrared, ultrasonic and inertial guidance devices for detection of aircraft orientation and location; tachometers, current and voltage sensors, and thermocouples for detection of thruster operating conditions, and voltage and temperature sensors adapted to monitor the condition of the batteries. Electromechanical sensors and strain gauges can be used to monitor flaperon position and dynamic and static loads at key structural elements. Commercially available motion detection and processing units, comprising a 3-axis gyroscope and a 3-axis accelerometer on a single chip, together with a processor capable of processing the sensors' outputs into a computer-comprehensible digital signal, are particularly preferred.

A suite of navigation instruments, as are known in the art, is preferably installed in the cockpit, and may interface with the flight control system. In some embodiments a pre-planned flight may be stored in non-volatile memory, and used by the processor to control flight. Communication with satellite or ground-based receivers may be provided, whereby flight data and aircraft conditions are automatically uploaded for later evaluation, digital maintenance records, and performance review.

The flight control software is configured, as is known in the art, to convert pilot control inputs into appropriate commands to the thruster motors and flaperons. Certain operations, such maintenance of trim, airspeed, and altitude at pilot-selected setpoints, may be automated. Optimum energy efficiency may be automatically maintained by adjustment of the aircraft's operating parameters. Preferably, the pilot is provided at all times with the present battery charge, power consumption, and remaining flight time and range under the present operating conditions. Optionally, data may be provided to a pilot's laptop, tablet or cell-phone via onboard wireless (e.g., Wi-Fi, Bluetooth, or NFC) communication, for display via an installed application. For security, the flight control system may be configured so that the presence of a specific wireless device is essential to operation of the craft.

In the event of an in-flight loss of lift or control, the craft is preferably provided with an emergency parachute system capable of delivering the craft to the ground without injury to pilot or passengers. Interior air bags are provided, which deploy upon detection of an impact, and preferably, the controlled deformation of the landing gear and/or elements of the internal airframe will absorb and dissipate the energy of a crash. Appropriate technologies, developed by the automobile industry, are well known and are readily adaptable to personal aircraft.

Although the invention as illustrated and described herein is embodied in a specific example, it is not intended to be limited to the details shown. Various modifications, substitutions and structural changes, which will be apparent to those skilled in the art, can be made without departing from the spirit of the invention. Unless explicitly disclaimed, such equivalents and substitutes are intended to fall within the scope of the appended claims. Accordingly, it is intended that the appended claims be construed broadly and in a manner consistent with the true scope of the invention.

I claim:

1. A VTOL aircraft capable of horizontal wing-supported flight, comprising:
    a) a fuselage having forward, central, and aft portions;
    b) a first pair of airfoils joined to the forward portion of the fuselage;
    c) a second pair of airfoils joined to the aft portion of the fuselage;
    d) a cockpit integral to the central portion of the fuselage; and
    e) at least one vertical thruster fixedly embedded within each one of the airfoils;
wherein, during horizontal flight, laminar flow across the upper surfaces of the airfoils is directed into the vertical thrusters, and laminar flow across the lower surfaces of the airfoils is directed across the exits of the vertical thrusters.

2. The VTOL aircraft according to claim 1, wherein the angle of attack of the first pair of airfoils is greater than the angle of attack of the second pair of airfoils.

3. The VTOL aircraft according to claim 1, wherein the vertical thrusters are electrically powered.

4. The VTOL aircraft according to claim 2, wherein the vertical thrusters are electrically powered.

5. The VTOL aircraft according to claim 1, wherein the vertical thrusters provide supplemental lift during horizontal flight.

6. The VTOL aircraft according to claim 2, wherein the vertical thrusters provide supplemental lift during horizontal flight.

7. The VTOL aircraft according to claim 3, wherein the vertical thrusters provide supplemental lift during horizontal flight.

8. The VTOL aircraft according to claim 4, wherein the vertical thrusters provide supplemental lift during horizontal flight.

* * * * *